United States Patent Office 2,893,158
Patented July 7, 1959

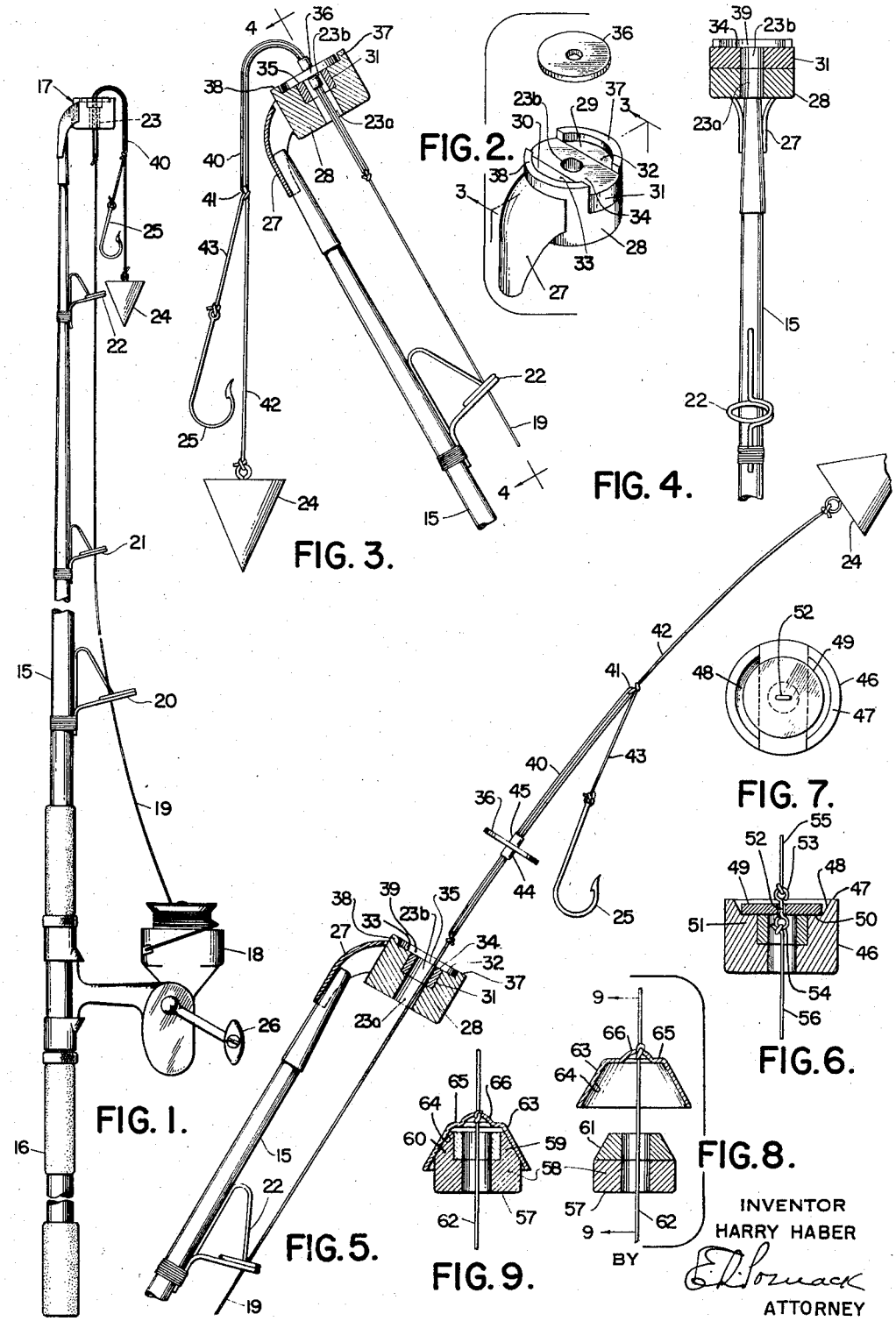

2,893,158

CASTING FISHING RODS

Harry Haber, Neponsit, N.Y.

Application December 5, 1958, Serial No. 778,435

11 Claims. (Cl. 43—24)

This invention relates to casting fishing rods, and is particularly directed to a novel form of tip construction.

In conventional casting rods the line extends from a reel or spinner which is attached to the rod near the handle thereof, the line slidably extending through a plurality of guide rings on the rod and through an apertured tip portion at the uppermost end of the rod—the outer portion of the line having attached thereto a sinker, lure, hooks, etc. In the casting operation of this conventional type of rod it is generally necessary simultaneously to perform two operations, one being the operation of manually releasing the reel or spinner device, and the other being the operation of whipping the line forwardly whereby the weight at the end of the line will cause an operative unreeling thereof. If the two operations are not performed simultaneously the casting operation may be ineffective. For example, if the reel or spinner is not released at the time the throw or casting swing is made, the line will be held against movement; and if the reel or spinner is released before the throw is made, there may be a loosening and back-lash movement of the line, with loss of distance and possible entanglement of the line. Hence, as aforesaid, with conventional rods it is necessary simultaneously to perform both operations, requiring what in effect is a dual control exercised by the operator. This requires special skill, and generally imposes a certain restraint upon the operator at the instant of the casting throw, so as to reduce the effective casting distance.

It is primarily the object of this invention to eliminate the need for such dual control in the simultaneous operation of two steps, so that the operator will be able to concentrate solely upon the casting or throwing operation. More specifically, it is my objective to eliminate the need for coordinated manual grasping and releasing actions of the reel or spinner at the time of the throw; and in this aspect of my invention it is a further object to eliminate the need to employ any special type of reel or spinner, such as certain conventional types having complicated mechanisms which hold or retard the line during the throw.

In the accomplishment of these objectives I employ an utterly new type of tip device which is effective in holding the line against forward or rearward movement—without any effort on the part of the operator—the arrangement being such as to release the line for operative movement by the single throwing or casting operation. More specifically, the device employs a releasable magnetic construction which maintains the line in taut condition until the throwing operation, whereafter the magnetically held element attached to the line is suddenly released by the force of the throw and the pull of the sinker—the sudden separation of the releasable element resulting in an operative unreeling of the line from a condition of tension.

Another object of my invention is the provision of stop means attached to the line and engageable with the tip, whereby the rewinding operation will be automatically stopped at the right point—an arrangement having particular utility in night fishing.

It is a further object of my invention to provide a relatively simple and inexpensive device capable of attaining the objectives hereinabove mentioned.

Other objects, features and advantages will appear from the drawings and the description hereinafter given.

Referring to the drawings,

Figure 1 is a side elevational view of a casting rod showing one embodiment of my invention, the line being shown in its fully retracted position.

Fig. 2 is a perspective view of the novel magnetic tip member and coactive disc of the device of Fig. 1, the said parts being shown in disassembled relation.

Fig. 3 is a fragmentary side elevation of the rod of Fig. 1 shown in retracted position, before a casting thereof, with the disc magnetically secured to the tip member which is shown in section taken along line 3—3 of Fig. 2.

Fig. 4 is a part sectional and part elevational view of Fig. 3, the section being taken along line 4—4, the disc and line being removed.

Fig. 5 is a side view of the rod of Fig. 1 shown during a casting movement, the disc being shown detached from the tip member.

Fig. 6 is an axial section of a modified form of tip member, showing the disc member operatively in place.

Fig. 7 is a top view of Fig. 6.

Fig. 8 is a disassembled axial section of still another embodiment of magnetic tip member and coactive element, showing a line attached to said element and operatively extending through the tip member.

Fig. 9 is a section of Fig. 8 taken along line 9—9, but showing the parts in assembled relation.

In the form of my invention illustrated in Figures 1 to 5, the fishing rod comprises the pole 15 the lower portion having the handle or butt 16 and the upper portion the apertured magnetic tip member 17 to be hereinbelow described. Carried by said butt is the spinner reel 18, although other reel types can also be employed if desired in connection with this invention. The construction of reel 18 is not set forth in detail, since it is well known to those skilled in the art. Suffice it to say, for the purpose of this specification, that said reel has operatively wound thereon the line 19 which extends upwardly through the guide rings 20, 21 and 22 attached to the pole, and out through the apertured portion 23 in said tip 17, the end of the particular line illustrated having attached thereto a conventional sinker 24 and hook 25. The arrangement is such, as will more clearly hereinafter appear, that upon a casting throw, the line will unreel itself and slidably move outwardly through said rings and tip. Upon an operative winding manipulation of the crank 26, in well-known manner, the line can be drawn in to an initial position.

The said tip 17 is supported by the brace 27 carried by the top of pole 15, the body portion 28 of the tip being, in this embodiment, of magnetic material. In other words, the body of the tip member is a magnet comprising the opposite poles 29 and 30 and having therein a central aperture 23a. A non-magnetic filler piece 31 is disposed between said pole portions at the upper section of the tip, said piece having a central aperture 23b therein of the same diameter as and in registry with the said aperture 23a—said apertures 23a and 23b both constituting the aforesaid apertured portion 23. The upper surfaces 32, 33 and 34 are preferably flush so as to constitute what in effect is a single flat receiving or engaging surface 35 for the iron or steel disc 36 to be hereinbelow described. In the particular embodiment of tip member illustrated, there are two upper opposite peripheral retaining walls 37 and 38 which, together with wall 35, form a receptacle 39 proportioned to loosely accommodate therein said disc.

The line 19 includes the conventional loop section 40 to the outer terminal 41 of which the line sections 42 and 43 are tied, these sections carrying the said sinker 24 and hook 25, respectively. Fixedly secured to said section 40 is the said metallic disc 36 held against movement relative to the line by the opposed retainer elements 44 and 45 clamped onto said line section 40.

In the operation of this device it is important that the line be drawn in by a winding manipulation of the crank 26 of reel 18 until the disc 36 prevents a further movement of the line, whereby the line is brought to taut condition. In other words, as the line 19 is drawn in the disc 36, being attached to the line slidably moving through the central aperture 23 of the tip member 17, is brought into engagement with the engaging surface 35 of the tip, whereby further inward movement of the line is prevented. This arrangement enables the operator to maintain the line in tension before the act of casting. It is preferred that the diameter of the circumference of the arcuate retaining walls 37 and 38 be greater than the diameter of the disc 36, so as to assure the disc's being brought within the receptacle 39 and in full engagement with the said upper surfaces 32 and 33 of the opposite poles of the magnetic body portion 28. Said retaining walls 37 and 38 also serve to keep the disc 36 within the receptacle 39 and in engagement with the poles 29 and 30 of the magnet, until the operative separation of the disc from the tip.

The disc 36 will be magnetically retained in place until separated from the tip by the casting movement from a retracted position like that shown in Fig. 3 towards a forward position like that shown in Fig. 5. Due to the whipping action of the operator's casting movement through a lever arm extending substantially from the butt 16 to the tip 17, as well as the weight of the disc 36 and the pull exerted thereon by the sinker 24, the said disc 36 will be suddenly released from the magnetic grip exerted by the poles 29 and 30. Since, as aforesaid, the line 19 has been maintained taut due to the coaction between reel 18 and the stop action of tip surface 35 on the disc, the sudden operative release of the latter will cause a positive outward movement of the line—without any back-lash or line entanglements, and without the need to manually control the tension in the line at the moment of the throw. The concentration of the operator on the single act of casting, and the above-described sudden release of the disc 36 and consequently of the line 19, result in a far more effective casting throw—and with less skill requisites—than is possible with conventional casting rods.

Modified forms of tip and disc members are shown in Figs. 6 and 7, the tip member 46 being substantially like the corresponding member of the first form above described, but differing therefrom in that the peripheral retaining wall 47 has the inner downwardly tapered conical wall 48 serving as a guide for the disc 49 as it is being drawn towards the tip in the manner aforesaid, thereby assuring the entry into and proper positioning of the said disc on the engaging surface 50 of the magnetic body portion 51. The particular form of disc has axially secured thereto the anchor member 52 with the opposite loops 53 and 54 to which the respective line sections 55 and 56 are attached.

Figures 8 and 9 represent still other modified forms of tip and disc members. The tip member 57 has a magnetic body portion 58 with opposite pole portions 59 and 60, the upper outer portion 61 of said member being frustro-conical, there being a central aperture therethrough to slidably accommodate the line 62. Instead of a disc member like the two above described, there is a corresponding iron or steel cap member 63 with an inner conical surface 64 proportioned for engagement with said frustro-conical portion 61—the top 65 of the cap having pressed out therefrom the anchor loop 66 to which said line 62 is tied. This construction enables a ready operative seating of the cap 63 on the magnetic body portion 58, and also provides an extended surface for magnetic contact when greater magnetic holding power is required.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

I claim:

1. In a casting fishing rod, a pole, reel means, line guide means on said pole including a terminal guide member, a line operatively wound upon said reel means and in slidable engagement with said guide means and extending outwardly beyond said terminal guide member, a stop member secured to the line at a point beyond said terminal guide member and operatively engageable therewith, whereby the line is held against further inward movement towards said reel means, and magnetic means for releasably holding said members in engagement.

2. In a casting fishing rod, a pole, reel means, line guide means on said pole, a line operatively wound upon said reel means and in slidable engagement with said guide means, magnetic line holding means comprising a stationary metallic member attached to said pole and a movable metallic member attached to said line and operatively engageable with said stationary member, whereby the line is held against further inward movement towards said reel means, at least one of said members being magnetic and adapted to magnetically attract the other member.

3. In a casting fishing rod, the combination according to claim 2, said stationary metallic member having guide means thereon in slidable engagement with said line.

4. In a casting fishing rod, the combination according to claim 2, said stationary metallic member having an apertured portion therein through which said line extends, said movable member being attached to said line at a point outwardly beyond said stationary member.

5. In a casting fishing rod, a pole, reel means, line guide means on said pole, a line operatively wound upon said reel means and in slidable engagement with said guide means, magnetic line holding means comprising a stationary centrally apertured tip member attached to the upper terminal of said pole and a movable member, said line extending through said apertured tip and having a hook element substantially at the end thereof, said movable member being secured to said line at a point intermediate said hook element and said tip member and being operatively engageable with said tip member, at least one of said members being magnetic and adapted to magnetically attract the other member.

6. In a casting fishing rod, the combination according to claim 5, said tip member having a marginal retaining wall, said movable member having said line attached to substantially the central portion thereof, said movable member being proportioned for fitting within the marginal confines of said wall when said movable member is in operative engagement with said tip member.

7. In a casting fishing rod, the combination according to claim 5, said tip member having a marginal retaining wall, said movable member being of disc-like configuration and having said line attached to substantially the central portion thereof, said movable member being proportioned for loosely fitting within the marginal confines of said wall when said movable member is in operative engagement with said tip member.

8. In a casting fishing rod, the combination according to claim 5, said tip member having a marginal retaining wall with an inner surface of substantially conical configuration and with the widest portion thereof at the top, said movable member having said line attached to substantially the central portion thereof, said movable member being proportioned for fitting within the peripheral confines of said inner surface when said movable member is in operative engagement with said tip member.

9. In a casting fishing rod, the combination according to claim 5, said tip member being a magnet and comprising two opposite poles in spaced relation and having upper surfaces substantially in one plane, said movable member being of metal adapted to be magnetically attracted by said magnet and being engageable with said upper surfaces of said poles.

10. In a casting fishing rod, the combination according to claim 5, said tip member being a magnet and comprising two opposite poles in spaced relation and having upper surfaces substantially in one plane, said movable member being of metal adapted to be magnetically attracted by said magnet and being engageable with said upper surfaces of said poles, and a centrally apertured filler piece of non-magnetic material between said poles.

11. In a casting fishing rod, a pole, reel means, line guide means on said pole, a line operatively wound upon said reel means and in slidable engagement with said guide means, magnetic line holding means comprising a stationary centrally apertured tip member attached to the upper terminal of said pole and a movable member, said line extending through said apertured tip and having a hook element substantially at the end thereof, said tip member being a magnet and having two opposite poles at the upper portion thereof, said movable member being of substantially inverted cup-shaped configuration proportioned for embracing engagement with said poles and being of metal adapted to be magnetically attracted by said magnet, said movable member being secured to said line at a point intermediate said hook element and said tip member, whereby when said members are in operative engagement the line is held against further inward movement towards said reel means.

No references cited.